US012601988B2

(12) United States Patent
Todokoro

(10) Patent No.: US 12,601,988 B2
(45) Date of Patent: Apr. 14, 2026

(54) IMAGE FORMING APPARATUS

(71) Applicant: KYOCERA Document Solutions Inc.,
Osaka (JP)

(72) Inventor: Ryotaro Todokoro, Osaka (JP)

(73) Assignee: KYOCERA Document Solutions Inc.,
Osaka (JP)

( * ) Notice: Subject to any disclaimer, the term of this
patent is extended or adjusted under 35
U.S.C. 154(b) by 3 days.

(21) Appl. No.: 18/785,412

(22) Filed: Jul. 26, 2024

(65) Prior Publication Data

US 2025/0044719 A1 Feb. 6, 2025

(30) Foreign Application Priority Data

Jul. 31, 2023 (JP) ................................. 2023-124215

(51) Int. Cl.
| | |
|---|---|
| *G03G 15/00* | (2006.01) |
| *B41J 2/44* | (2006.01) |
| *B41J 2/47* | (2006.01) |
| *G02B 26/12* | (2006.01) |
| *G03G 15/04* | (2006.01) |
| *G03G 15/043* | (2006.01) |
| *G03G 15/06* | (2006.01) |

(52) U.S. Cl.
CPC .......... *G03G 15/0435* (2013.01); *B41J 2/442*
(2013.01); *B41J 2/471* (2013.01); *G02B*
*26/121* (2013.01); *G03G 15/04036* (2013.01);
*G03G 15/065* (2013.01); *G03G 15/50*
(2013.01); *G03G 15/80* (2013.01)

(58) Field of Classification Search
CPC ......... G03G 15/04036; G03G 15/0435; G03G
15/065; G03G 15/50; G03G 15/80
USPC .................................. 399/38, 44, 51, 53, 55
See application file for complete search history.

(56) References Cited

U.S. PATENT DOCUMENTS 10,126,689 B2 * 11/2018 Hamano .............. G03G 15/043

FOREIGN PATENT DOCUMENTS

| | | | |
|---|---|---|---|
| JP | 2015-194613 A | 11/2015 | |
| JP | 2018169587 | * | 11/2018 |

* cited by examiner

*Primary Examiner* — Hoan H Tran
(74) *Attorney, Agent, or Firm* — Stein IP, LLC

(57) ABSTRACT

An optical scanning device includes a light source unit, a polygonal mirror, a scanning lens, a casing, and a temperature sensor. The light source unit is configured to emit a laser beam. The polygonal mirror is configured to reflect the emitted laser beam from the light source unit by being rotated about a rotation axis extending in an upper-and-lower direction, whereby a peripheral surface of an image bearing member is scanned in a main scanning direction. The scanning lens is configured to form the laser beam reflected by the polygonal mirror into an image on the peripheral surface of the image bearing member. The casing is configured to house the light source unit, the polygonal mirror, and the scanning lens. The temperature sensor is configured to detect a temperature in the casing. The temperature sensor is configured to detect a temperature of the developing device.

13 Claims, 5 Drawing Sheets

IMAGE FORMING APPARATUS

INCORPORATION BY REFERENCE

This application is based on and claims the benefit of priority from Japanese Patent Application No. 2023-124215 filed on Jul. 31, 2023, the contents of which are hereby incorporated by reference.

BACKGROUND

The present disclosure relates to an image forming apparatus such as a copying machine, a printer, a facsimile machine, or a multifunction peripheral that has functions of these apparatuses, the image forming apparatus including an optical scanning device that forms electrostatic latent images on surfaces to be scanned through an exposure scan.

Related-art image forming apparatuses include the optical scanning device. The optical scanning device includes a light source unit, a polygonal mirror, a scanning lens, a casing, and a temperature sensor. The light source unit is configured to emit a laser beam. The polygonal mirror is configured to reflect the emitted laser beam from the light source unit by being rotated about a rotation axis extending in an upper-and-lower direction, whereby a peripheral surface of an image bearing member is scanned in a main scanning direction. The scanning lens is configured to form the laser beam reflected by the polygonal mirror into an image on the peripheral surface of the image bearing member. The casing is configured to house the light source unit, the polygonal mirror, and the scanning lens. The temperature sensor is configured to detect a temperature in the casing.

A problem with employment of the related art is that a rise in temperature of a developing device causes defects in toner images to be formed on the image bearing member.

In view of such problems, the present disclosure has been made to achieve an object to provide an image forming apparatus that is capable of suppressing image defects while suppressing an increase in manufacturing cost.

SUMMARY

In order to achieve the above-mentioned object, according to a first configuration of the present disclosure, there is provided an image forming apparatus including: an optical scanning device; an image bearing member; a charging device; a developing device; and a control unit.

The optical scanning device includes a light source unit, a polygonal mirror, a scanning lens, a casing, and a temperature sensor.

The light source unit is configured to emit a laser beam.

The polygonal mirror is configured to reflect the emitted laser beam from the light source unit by being rotated about a rotation axis extending in an upper-and-lower direction, whereby a peripheral surface of an image bearing member is scanned in a main scanning direction.

The scanning lens is configured to form the laser beam reflected by the polygonal mirror into an image on the peripheral surface of the image bearing member.

The casing is configured to house
the light source unit,
the polygonal mirror, and
the scanning lens.

The temperature sensor is configured to detect a temperature in the casing.

The image bearing member includes an at least one image bearing member having a surface on which a photosensitive layer is formed.

The charging device is configured to charge the image bearing member with a predetermined surface potential.

The developing device
is arranged to face the image bearing member,
includes a developer carrying member which is configured to carry a developer, and
is configured to form a toner image by applying predetermined developing voltage to the developer carrying member to cause a toner to adhere to an electrostatic latent image formed on the image bearing member.

The control unit is configured to control
the optical scanning device, and
the developing device.

The temperature sensor detects a temperature of the developing device.

The control unit
controls the optical scanning device on a basis of the temperature in the casing, the temperature in the casing being detected by the temperature sensor, and
controls the developing device on a basis of the temperature of the developing device, the temperature of the developing device being detected by the temperature sensor.

This and other objects of the present disclosure, and the specific benefits obtained according to the present disclosure, will become apparent from the description of embodiments which follows.

DETAILED DESCRIPTION

[1. Configuration of Image Forming Apparatus]

Figure 1:
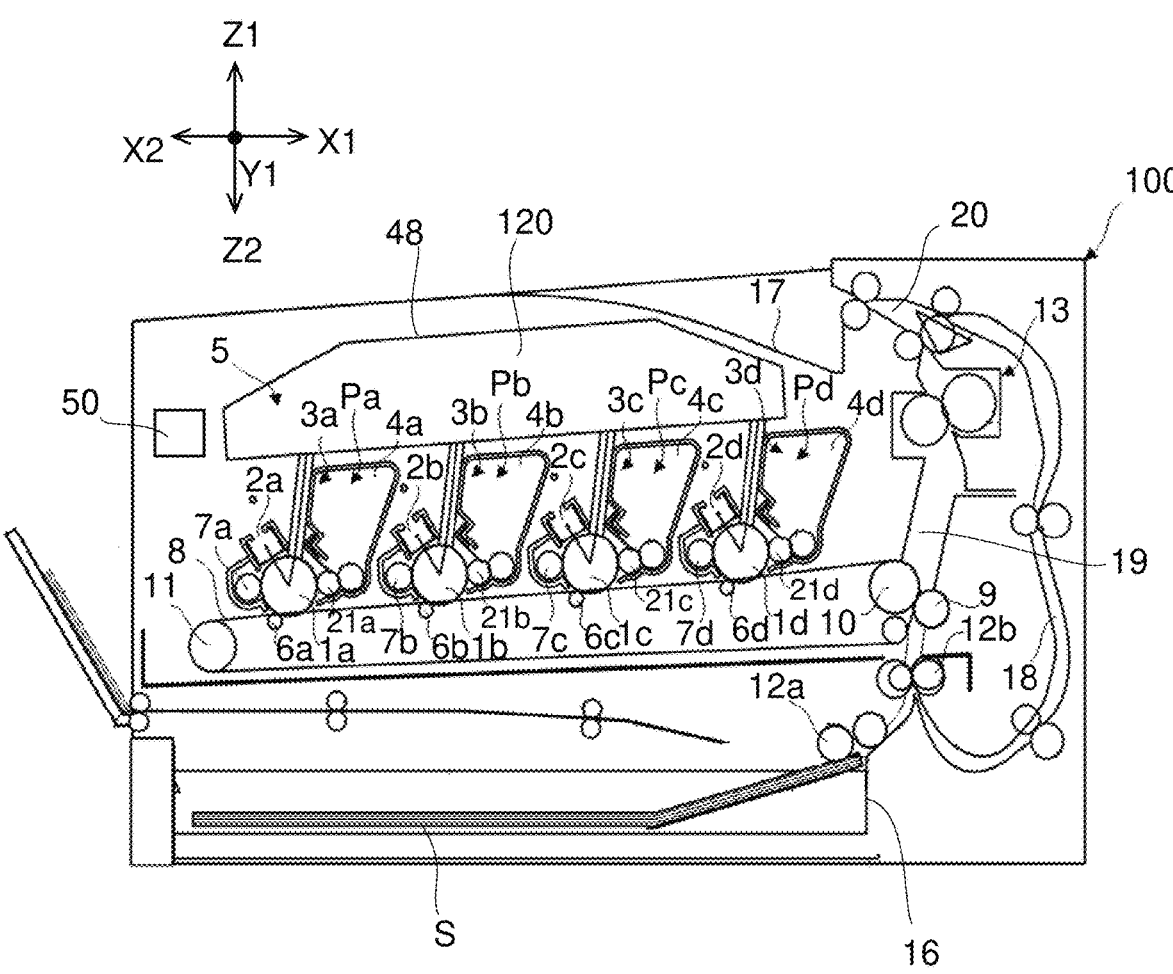
FIG. 1 is a schematic cross-sectional view illustrating an overall configuration of an image forming apparatus 100 in which an optical scanning device 5 according to an embodiment of the present disclosure is installed.

In the following, an embodiment of the present disclosure is described with reference to the drawings. FIG. 1 is a schematic cross-sectional view illustrating an overall configuration of an image forming apparatus 100 in which an optical scanning device 5 according to the embodiment of the present disclosure is installed. For the sake of convenience of description, a vertical direction under an installed state in which the image forming apparatus 100 is usable (state illustrated in FIG. 1) is defined as an upper-and-lower direction (Z1-Z2 direction). Further, a front-and-back direction (Y1-Y2 direction) is defined relative to a front (front surface) being a surface on a side corresponding to a reader's side of the drawing sheet of FIG. 1 among sides of the image forming apparatus 100 illustrated in FIG. 1. Still further, a right-and-left direction (X1-X2 direction) is defined relative to the front of the image forming apparatus 100 under the installed state. In this embodiment, the right-and-left direction (X1-X2 direction) is orthogonal to the upper-and-lower direction (Z1-Z2 direction) and the front-and-back direction (Y1-Y2 direction).

The image forming apparatus 100 includes the optical scanning device 5, photosensitive drums (image bearing members) 1a, 1b, 1c, and 1d, charging devices 2a, 2b, and 2c, and 2d, developing devices 3a, 3b, 3c, and 3d, primary transfer rollers 6a, 6b, 6c, and 6d, a secondary transfer roller 9, a sheet-feeding cassette 16, a fixing section 13, and a control unit 50.

Specifically, the image forming apparatus 100 is a tandem-type color printer. The image forming apparatus 100 includes, as its image bearing members, the photosensitive drums 1a to 1d that are rotatable. Photosensitive members such as organic photosensitive members each formed of an organic photosensitive layer (OPC photosensitive members) or amorphous-silicon photosensitive members each formed of an amorphous-silicon photosensitive layer are used as the photosensitive drums 1a to 1d. The photosensitive drums 1a to 1d are arranged in tandem to correspond respectively to colors of yellow, cyan, magenta, and black.

The developing device 3a, the charging device 2a, and a cleaning device 7a are disposed around the photosensitive drum (image bearing member) 1a. Similarly, the developing devices 3b to 3d, the charging devices 2b to 2d, and cleaning devices 7b to 7d are disposed respectively around the photosensitive drums 1b to 1d. In addition, the optical scanning device 5 is disposed on an upper side Z1 relative to the developing devices 3a to 3d.

The developing devices 3a to 3d are arranged on a right-hand side X1 relative respectively to the photosensitive drums 1a to 1d. The developing devices 3a to 3d are arranged to face the photosensitive drums (image bearing members) 1a to 1d, and include developing rollers (developer carrying members) 21a, 21b, 21c, and 21d. The developing devices 3a to 3d form toner images by applying predetermined developing voltage to the developing rollers (developer carrying members) 21a to 21d to cause toners to adhere to electrostatic latent images formed on the photosensitive drums (image bearing members) 1a to 1d. The developing devices 3a to 3d respectively face the photosensitive drums 1a to 1d, and supply the toners respectively to the photosensitive drums 1a to 1d. The developing devices 3a to 3d respectively include containers 4a, 4b, 4c, and 4d that respectively contain the toners corresponding to the colors of magenta, cyan, yellow, and black.

The charging devices 2a to 2d are arranged on an upstream side relative respectively to the developing devices 3a to 3d in a rotation direction of the photosensitive drums 1a to 1d, and respectively face surfaces of the photosensitive drums 1a to 1d. The charging devices 2a to 2d uniformly charge the surfaces of the photosensitive drums 1a to 1d, respectively. More specifically, The charging devices 2a to 2d are configured to charge the image bearing member with a predetermined surface potential.

In this embodiment, the optical scanning device 5 is arranged on the upper side Z1 relative to the developing devices 3a to 3d. The optical scanning device 5 radiates light to (performs an optical scan of) the surfaces of the photosensitive drums 1a to 1d on the basis of image data of letters, pictures, and the like that are input from a personal computer or the like to an image input unit, the surfaces having been uniformly charged by the charging devices 2a to 2d. With this, the electrostatic latent images are formed on the surfaces of the photosensitive drums 1a to 1d.

Figure 4:
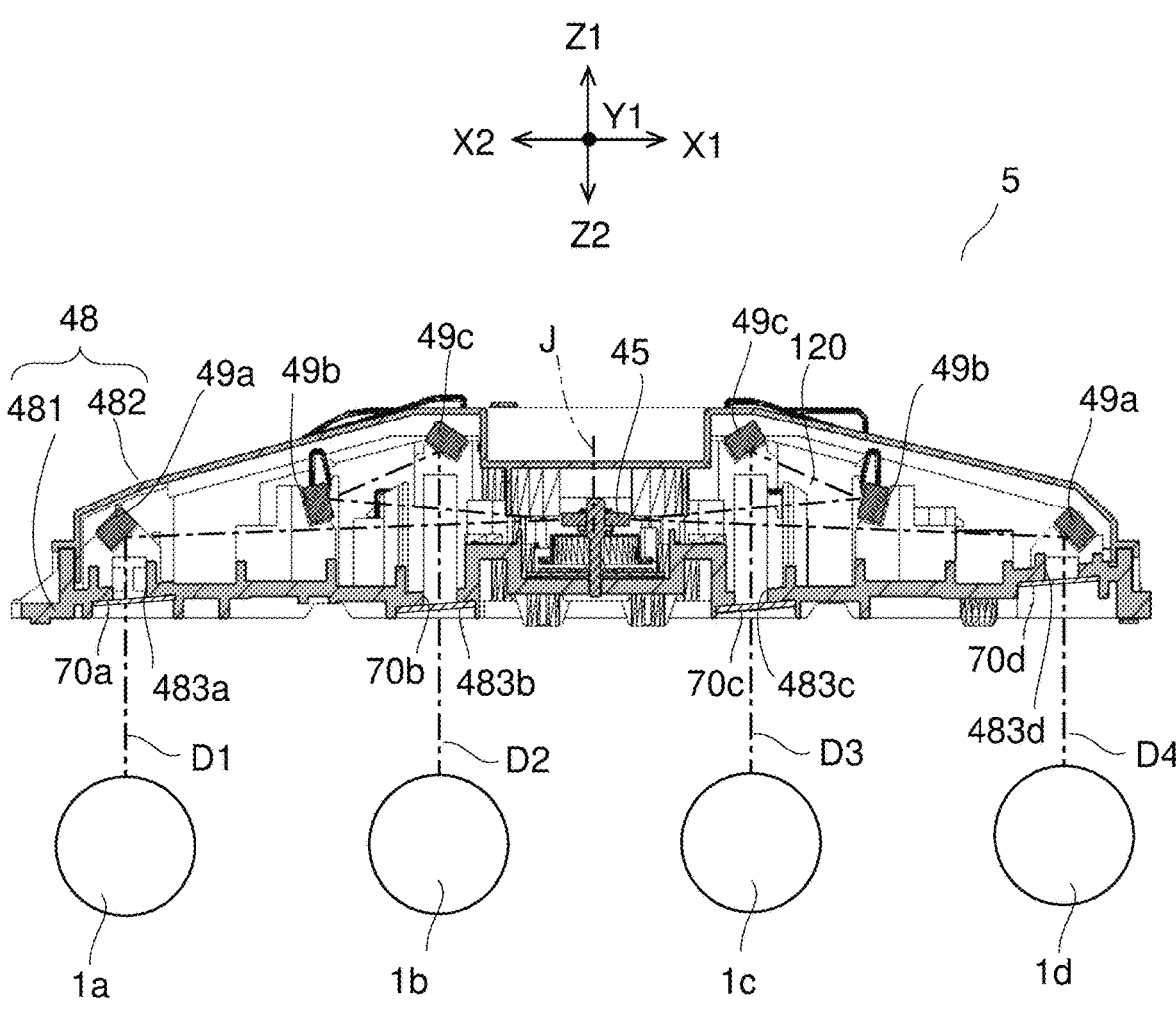
FIG. 4 is a cross-sectional view as viewed in a direction indicated by arrows A-A in FIG. 2.

A casing 48 of the optical scanning device 5 is a resin molded product, and includes a housing portion 481 opened on its one side (upper side in this embodiment), and a lid portion 482 that covers this opening (refer to FIG. 4). The housing portion 481 houses therein an optical scanning system.

Laser beams D1, D2, D3, and D4 are radiated respectively to the surfaces of the photosensitive drums 1a to 1d on a downstream side relative to the charging devices 2a to 2d in the rotation direction of the photosensitive drums 1a to 1d. With this, the electrostatic latent images are formed on the surfaces of the photosensitive drums 1a to 1d. These electrostatic latent images are developed into toner images by the developing devices 3a to 3d.

An endless intermediate-transfer belt 8 is stretched around a drive roller 10 and a driven roller 11. The drive roller 10 is rotated by a motor (not shown). With this, the intermediate transfer belt 8 is driven to circulate in a clockwise direction in FIG. 1.

The photosensitive drums 1a to 1d are arrayed adjacent to each other along a conveying direction on the upper side Z1 relative to the intermediate transfer belt 8. In addition, all the photosensitive drums 1a to 1d are held in contact with the intermediate transfer belt 8.

The primary transfer rollers 6a to 6d respectively face the photosensitive drums 1a to 1d with the intermediate transfer belt 8 sandwiched therebetween. All the primary transfer rollers 6a to 6d are held in press-contact with the intermediate transfer belt 8, and form primary transfer sections cooperatively with the photosensitive drums 1a to 1d. In these primary transfer sections, the toner images are transferred onto the intermediate transfer belt 8.

Specifically, primary transfer voltage is applied to the primary transfer rollers 6a to 6d to cause the toner images on the photosensitive drums 1a to 1d to be sequentially transferred at a predetermined timing onto the intermediate transfer belt 8. In this way, a full-color toner image in which the toner images corresponding respectively to the four colors of magenta, cyan, yellow, and black are superimposed on each other in a predetermined positional relationship is formed on a surface of the intermediate transfer belt 8.

The secondary transfer roller 9 faces the drive roller 10 with the intermediate transfer belt 8 sandwiched therebetween. The secondary transfer roller 9 is held in press-contact with the intermediate transfer belt 8, and forms a secondary transfer section cooperatively with the drive roller 10. In this secondary transfer section, secondary transfer voltage is applied to the secondary transfer roller 9 to cause the toner images on the surface of the intermediate transfer belt 8 to be transferred onto sheets S. After the transfer of the toner images, a belt cleaning device (not shown) cleans off residual toner on the intermediate transfer belt 8.

On a lower side in the image forming apparatus 100, the sheet-feeding cassette 16 is disposed. The sheet-feeding cassette 16 is capable of storing the plurality of sheets S. On a right-hand side X1 relative to the sheet-feeding cassette 16, a sheet conveying path 19 is disposed.

The sheet conveying path 19 conveys the sheets S that have been fed out of the sheet-feeding cassette 16 to the secondary transfer section. On an upper right-hand side in the image forming apparatus 100, the fixing section 13 and a sheet conveying path 20 are disposed. The fixing section 13 executes a fixing process on the sheets S on which the images have been formed. The sheet conveying path 20 conveys the sheets S that have been subjected to the fixing process to a sheet discharge section 17.

The sheets S stored in the sheet-feeding cassette 16 are fed out one by one by a pick-up roller 12a to a side where the sheet conveying path 19 is present.

A registration roller pair 12b conveys the sheets S to the secondary transfer section at an appropriate timing between an operation of the image formation on the intermediate transfer belt 8 and an operation of the sheet feeding to the secondary transfer section. The secondary transfer roller 9 to which the secondary transfer voltage has been applied causes the full-color toner image on the intermediate transfer belt 8 to be secondarily transferred onto the sheets S that have been transferred to the secondary transfer section. The sheets S to which the full-color toner image has been transferred are conveyed to the fixing section 13.

The fixing section 13 includes a fixing belt that is heated by a heater, a fixing roller that is held in contact with an inner side of the fixing belt, and a pressure roller that is held in press contact with the fixing roller with the fixing belt sandwiched therebetween. The fixing section 13 heats and presses the sheets S to which the toner images have been transferred. In this way, the fixing process is executed. The sheets S to which the toner images have been fixed in the fixing section 13 are flipped over as appropriate in a sheet conveying path 18. Then, the sheets S are conveyed to the secondary transfer section again through the registration roller pair 12b. Next, new toner images are secondarily transferred onto back surfaces of the sheets S by the secondary transfer roller 9, and then are fixed in the fixing section 13. The sheets S to which the new toner images have been fixed are conveyed through the sheet conveying path 20, and then discharged to the sheet discharge section 17.

In addition, the control unit 50 is arranged in the image forming apparatus 100. The control unit 50 collectively control the image forming apparatus 100. Specifically, the control unit 50 controls an image forming section. The image forming section includes the optical scanning device 5, the photosensitive drums (image bearing members) 1a to 1d, the charging devices 2a to 2d, and the developing devices 3a to 3d. More specifically, the control unit 50 controls the optical scanning device 5 and the developing devices 3a to 3d.

[2. Configuration of Optical Scanning Device]

Figure 2:
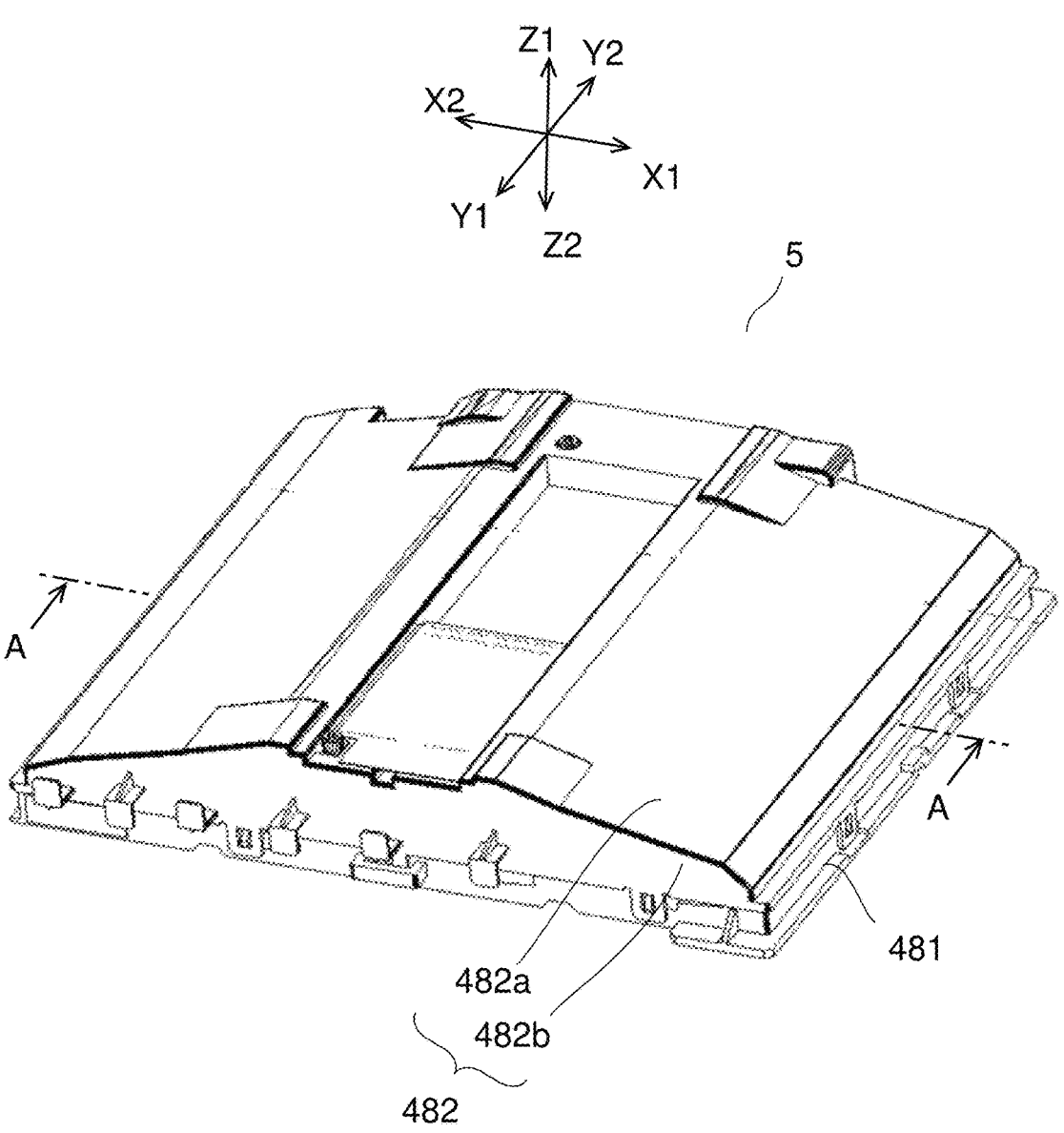
FIG. 2 is a perspective view of the optical scanning device 5 according to the embodiment of the present disclosure.
Figure 3:
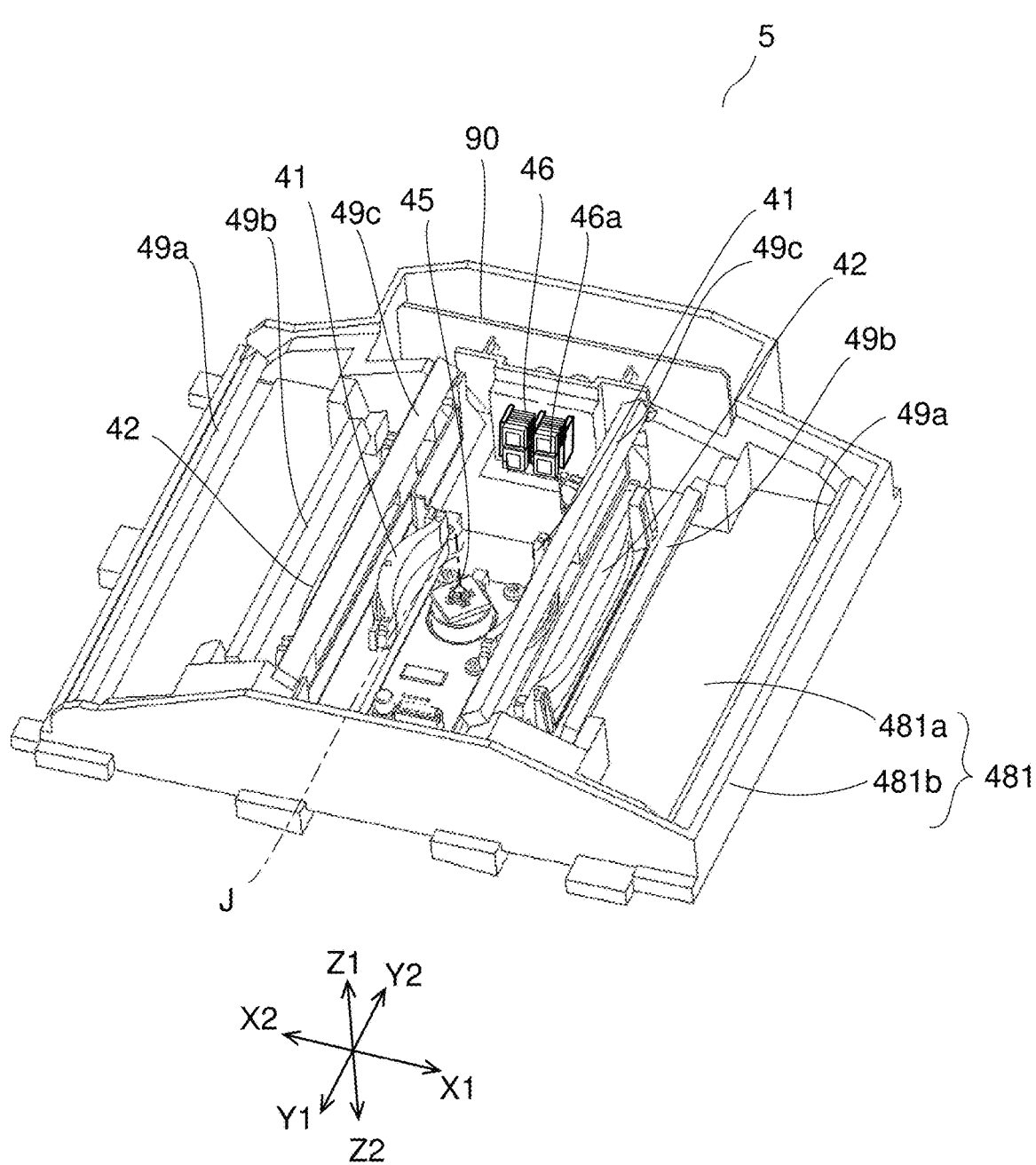
FIG. 3 is another perspective view of the optical scanning device 5 according to the embodiment of the present disclosure.

FIG. 2 and FIG. 3 are perspective views of the optical scanning device 5. FIG. 3 illustrates a state in which the lid portion 482 is removed. FIG. 4 is a cross-sectional view as viewed in a direction indicated by arrows A-A in FIG. 2. Some parts of FIG. 4 schematically illustrate configurations of components, and hence need not necessarily illustrate strict shapes of or positional relationships between the components. In addition, FIG. 4 does not illustrate scanning lenses 41 or scanning lenses 42.

Note that, in the following description, a main scanning direction (Y1-Y2 direction) is a longitudinal direction of reflecting mirrors 49a, 49b, and 49c. In addition, the main scanning direction (Y1-Y2 direction) is identical to a direction in which rotation axes of the photosensitive drums 1a to 1d extend and to the front-and-back direction of the image forming apparatus 100. A sub-scanning direction (Z1-Z2 direction) is a direction that is parallel to a rotation axis J of a polygonal mirror 45, and that is identical to the upper-and-lower direction of the image forming apparatus 100. In addition, the right-and-left direction (X1-X2 direction) is a direction that is orthogonal to the main scanning direction (Y1-Y2 direction) and to the sub-scanning direction (Z1-Z2 direction), and that is identical to a direction in which the reflecting mirrors 49a to 49c are arrayed.

The optical scanning device 5 outputs (radiates), to the photosensitive drums 1a to 1d, the plurality of (four in this embodiment) laser beams D1 to D4 that have been modulated respectively in accordance with image signals. In this way, the optical scanning device 5 exposes the respective surfaces of the photosensitive drums 1a to 1d to form the electrostatic latent images that have been attenuated in charge.

The optical scanning device 5 includes a light source unit 46, the polygonal mirror 45, the pair of scanning lenses 41, the pair of scanning lenses 42, the pairs of reflecting mirrors 49a to 49c, the casing 48, and a circuit board 90.

The casing 48 includes the housing portion 481 and the lid portion 482. The housing portion 481 is formed into a substantially quadrangular shape in plan view. The housing portion 481 houses the light source unit 46, the polygonal mirror 45, the pair of scanning lenses 41, the pair of scanning lenses 42, the pairs of reflecting mirrors 49a to 49c, and the circuit board 90.

The housing portion 481 includes a bottom wall portion 481a and peripheral wall portions 481b. The bottom wall portion 481a expands in a direction that is orthogonal to the rotation axis J of the polygonal mirror 45. Exit ports 483a, 483b, 483c, and 483d are formed in the upper-and-lower direction through the bottom wall portion 481a (refer to FIG. 4). The exit ports 483a to 483d extend in the main scanning direction (Y1-Y2 direction). The laser beams D1 to D4 that are emitted from the optical scanning system are emitted to an outside of the casing 48 through the exit ports 483a to 483d, and then are respectively incident on corresponding ones of the photosensitive drums 1a to 1d. The exit ports 483a to 483d are covered respectively with dust-proof glasses 70a, 70b, 70c, and 70d. With this, ingress of dust into the casing 48 can be prevented.

Figure 5:
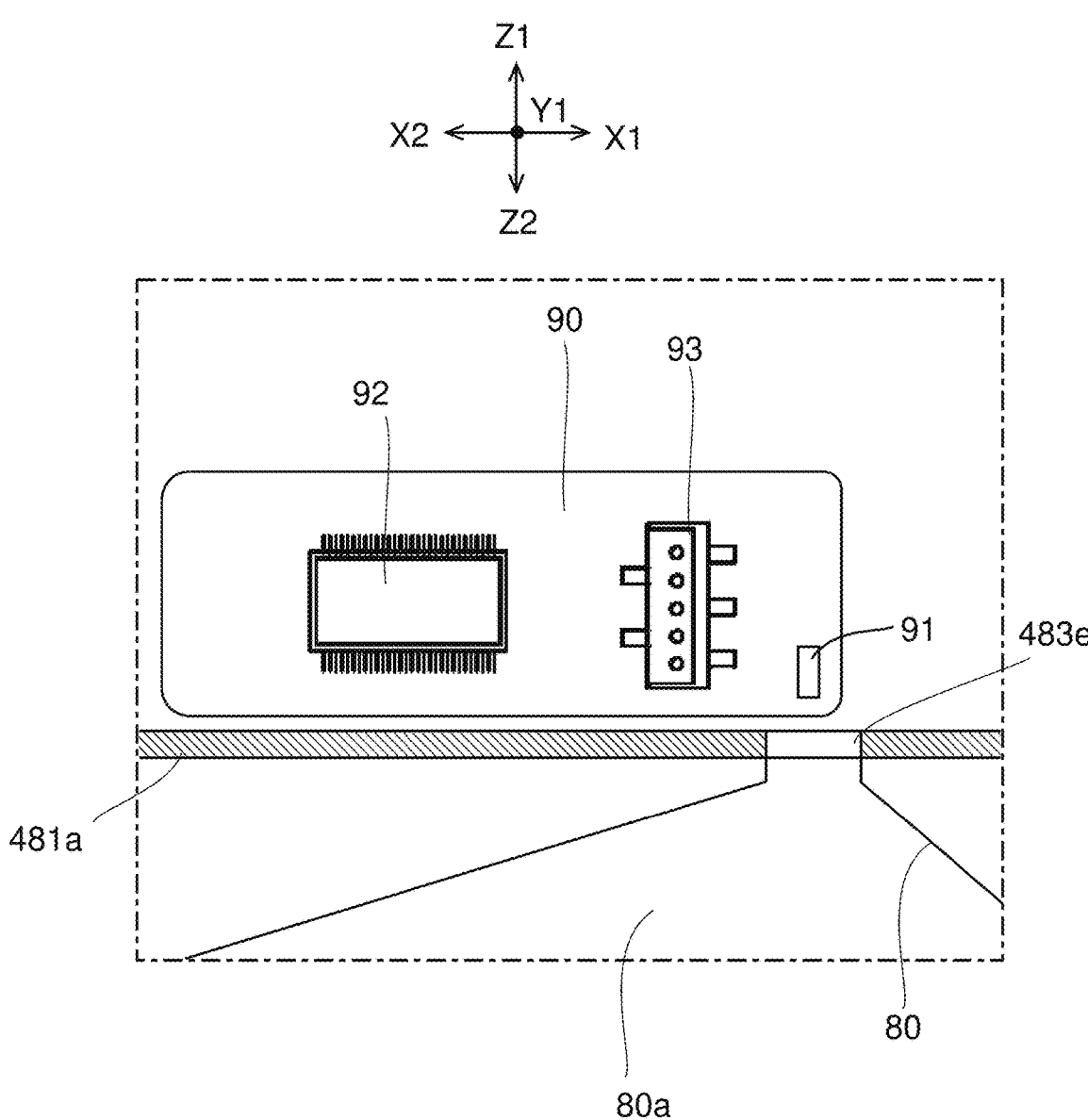
FIG. 5 is an enlarged explanatory view illustrating a vicinity of a circuit board 90 of the optical scanning device 5 according to the embodiment of the present disclosure.

An opening portion 483e is formed in the upper-and-lower direction through the bottom wall portion 481a (refer to FIG. 5). In this embodiment, the opening portion 483e is arranged on a back side (Y2 side) relative to the light source unit 46, and opened to face the photosensitive drums (image bearing members) 1a to 1d and the developing devices 3a to 3d. In addition, in the casing 48, a temperature sensor (thermistor) 91 described below is arranged to face the opening portion 483c. This enables the temperature sensor 91 to detect temperatures of the developing devices 3a to 3d with accuracy from an inside of the casing 48. Specifically, the temperature sensor 91 can detect temperatures of the developing rollers (developer carrying members) 21a to 21d of the developing devices 3a to 3d with accuracy.

The peripheral wall portions 481b extend upward from outer peripheral portions of the bottom wall portion 481a, and surround the light source unit 46, the polygonal mirror 45, the pair of scanning lenses 41, the pair of scanning lenses 42, the pairs of reflecting mirrors 49a to 49c, and the circuit board 90 therein.

The lid portion 482 includes a top surface portion 482a and peripheral surface portions 482b. The top surface portion 482a covers the opened upper side of the housing portion 481. The peripheral surface portions 482b extend downward from outer peripheral portions of the top surface portion 482a, and surround parts of the peripheral wall portions 481b.

The light source unit 46 includes a plurality of light-emitting modules 46a that emit the laser beams. The light-emitting modules 46a respectively output the laser beams D1 to D4 corresponding respectively to the colors of Y (yellow), C (cyan), M (magenta), and K (black). The laser beams D1 to D4 emitted respectively from the light-emitting modules 46a are radiated to the polygonal mirror 45. Near deflecting surfaces of the polygonal mirror 45, the laser beams D1 to D4 form linear images.

In this embodiment, the circuit board 90 is arranged on the back side (Y2 side) relative to the light source unit 46, and held upright and orthogonal to the main scanning direction (Y1-Y2 direction) by the housing portion 481 (refer to FIG. 3). The temperature sensor 91 and an IC driver 92 described below are mounted to the circuit board 90. The circuit board 90 is described in detail below.

The polygonal mirror 45 is rotated about the rotation axis J extending in the upper-and-lower direction (Z1-Z2 direction), and reflects the laser beams D1 to D4 emitted from the light source unit 46. With this, peripheral surfaces of the photosensitive drums (image bearing members) 1a to 1d are scanned in the main scanning direction.

The polygonal mirror 45 is constituted by a plurality of reflecting surfaces. In this embodiment, the polygonal mirror 45 is a multi-sided mirror formed into a shape of a quadrangular prism. The laser beams D1 and D2 that have been incident on the polygonal mirror 45 are deflected and used for scans by arbitrary ones of the reflecting surfaces of the polygonal mirror 45 that is driven to rotate, specifically, reflected in a left-hand direction (X2 direction) and guided to the scanning lenses 41 and the scanning lenses 42 by the reflecting surfaces (refer to FIG. 4). Meanwhile, the laser beams D3 and D4 that have been incident on the polygonal mirror 45 are deflected and used for scans by arbitrary ones of the reflecting surfaces of the polygonal mirror 45 that is driven to rotate, specifically, reflected in a right-hand direction (X1 direction) and guided to the scanning lenses 41 and the scanning lenses 42 by the reflecting surfaces (refer to FIG. 4).

The scanning lenses 42 are arranged on a downstream side relative to the scanning lenses 41 in optical paths of the laser beams D1 to D4.

The scanning lenses 41 are elongated lenses each having distortion (fθ characteristics) and extending along the main scanning direction (Y1-Y2 direction). The scanning lenses 41 converge the laser beams D1 to D4 reflected by the deflecting surfaces of the polygonal mirror 45.

Similar to the scanning lenses 41, the scanning lenses 42 are elongated lenses each having distortion (fθ characteristics) and extending along the main scanning direction (Y1-Y2 direction). The scanning lenses 42 converge and form the laser beams D1 to D4 that have passed through the scanning lenses 41 into images respectively on surfaces to be scanned of the photosensitive drums 1a to 1d.

The pair of reflecting mirrors 49a respectively reflect the laser beams D1 and D4. One and another one of the pair of reflecting mirrors 49b and one and another one of the pair of reflecting mirrors 49c respectively reflect the laser beams D2 and D3.

The scanning lenses 41 and 42 form the laser beams D1 to D4 reflected by the polygonal mirror 45 into the images on the surfaces to be scanned (peripheral surfaces) of the photosensitive drums (image bearing members) 1a to 1d.

The laser beams D1 to D4 reflected and deflected by the polygonal mirror 45 are converged onto the surfaces to be scanned of the photosensitive drums 1a to 1d through the scanning lenses 41 and the scanning lenses 42. With this, beam spots are formed on the surfaces to be scanned of the photosensitive drums 1a to 1d. In addition, the laser beams D1 to D4 converged on the surfaces to be scanned of the photosensitive drums 1a to 1d scan these surfaces to be scanned of the photosensitive drums 1a to 1d at a constant speed.

At this time, the rotation of the polygonal mirror 45 causes the laser beams D1 to D4 to scan the surfaces to be scanned (peripheral surfaces) of the photosensitive drums (image bearing members) 1a to 1d in the main scanning direction (Y1-Y2 direction). In addition, along with the rotation of the photosensitive drums 1a to 1d, the laser beams D1 to D4 scan the surfaces of the photosensitive drums 1a to 1d in the sub-scanning direction (Z1-Z2 direction) to form the electrostatic latent images on these surfaces.

[3. Configuration of Circuit Board]

FIG. 5 is an enlarged explanatory view illustrating a vicinity of the circuit board 90. In this embodiment, the circuit board 90 is arranged on the back side (Y2 side) relative to the light source unit 46, and held upright and orthogonal to the main scanning direction (Y1-Y2 direction) by the housing portion 481 (refer to FIG. 3). The temperature sensor 91 and the IC driver 92 are mounted to the circuit board 90. On the circuit board 90, the temperature sensor 91 is arranged on a side that is opposite to a side where the IC driver 92 is present with an external connection terminal 93 interposed therebetween. The temperature sensor 91 detects a temperature of the inside of the casing 48 and the temperatures of the developing devices 3a to 3d.

In this embodiment, the temperature sensor 91 is arranged at a lower end portion of the circuit board 90, and faces the opening portion 483e. This enables the temperature sensor 91 to detect the temperatures of the developing devices 3a to 3d with accuracy from the inside of the casing 48.

Further, a duct 80 is arranged between the optical scanning device 5 and the developing devices 3a to 3d. The duct 80 covers end portions on the back side (Y2 side) in the main scanning direction (Y1-Y2 direction) among portions of the developing devices 3a to 3d from above, and channels heat of the developing devices 3a to 3d to the side where the temperature sensor 91 is present. Still further, an internal flow path 80a of the duct 80 is narrowed toward the temperature sensor 91 (in a direction to the upper side Z1). This enables the temperature sensor 91 to detect the temperatures of the developing devices 3a to 3d with higher accuracy from the inside of the casing 48.

The IC driver 92 is connected to the above-described control unit 50. The IC driver 92 is connected also to the light source unit 46 and the temperature sensor 91. The control unit 50 transmits a signal to the light source unit 46 via the IC driver (a control unit) 92 on the basis of the temperature in the casing 48, the temperature being detected by the temperature sensor 91. In this way, the control unit 50 controls timings to start the scans with the laser beams D1 to D4 that are emitted by the light source unit 46 (light-emission timings). With this, color shifts and the like can be corrected to suppress image defects.

Further, the control unit 50 is also capable of controlling the rotation of the polygonal mirror 45 on the basis of the temperature in the casing 48, the temperature being detected by the temperature sensor 91. On the basis of the temperature in the casing 48, the temperature being detected by the temperature sensor 91, both the light-emission timings of the light source unit 46 and the rotation of the polygonal mirror 45 are controlled. With this, color shifts and the like can be corrected to further suppress image defects.

Although the IC driver 92 generates heat during operation, the temperature sensor 91 is unlikely to be affected by the heat generation of the IC driver 92. This is because, on the circuit board 90, the temperature sensor 91 is arranged on the side that is opposite to the side where the IC driver 92 is present with the external connection terminal 93 interposed therebetween. In this way, the light-emission timings of the light source unit 46 can be controlled with accuracy on the basis of the temperatures detected by the temperature sensor 91.

Still further, the control unit 50 is connected to the developing devices 3a to 3d. The control unit 50 is also capable of controlling the developing devices 3a to 3d on the basis of the temperatures of the developing devices 3a to 3d, the temperatures being detected by the temperature sensor 91. The temperature sensor 91 detects both the temperature in the casing 48 and the temperatures of the developing devices 3a to 3d. With this, the image forming apparatus 100 that is capable of suppressing image defects while suppressing an increase in manufacturing cost can be provided.

Specifically, the control unit 50 controls magnitude of the developing voltage on the basis of the temperatures of the developing devices 3a to 3d, the temperatures being detected by the temperature sensor 91. By controlling the magnitude of the developing voltage, image density of the toner images can be adjusted. In addition, the control unit 50 stops driving the developing devices 3a to 3d once the temperatures of the developing devices 3a to 3d, the temperatures being detected by the temperature sensor 91, have exceeded a predetermined threshold. This enables the developing devices 3a to 3d to stop being driven in advance before occurrence of problems to be caused, for example, by aggregation of toner and the like or variation of their characteristics in the developing devices 3a to 3d. As a result, image defects can be prevented.

Note that, the present disclosure is not limited to the embodiment as described hereinabove, and may be variously modified within the gist of the present disclosure.

The present disclosure is applicable to an optical scanning device that forms electrostatic latent images on surfaces to be scanned through an exposure scan.

What is claimed is:

1. An image forming apparatus, comprising:
an optical scanning device including
a light source unit that is configured to emit a laser beam,
a polygonal mirror that is configured to reflect the emitted laser beam from the light source unit by being rotated about a rotation axis extending in an upper-and-lower direction, whereby a peripheral surface of an image bearing member is scanned in a main scanning direction,
a scanning lens that is configured to form the laser beam reflected by the polygonal mirror into an image on the peripheral surface of the image bearing member,
a casing that is configured to house
the light source unit,
the polygonal mirror, and
the scanning lens, and
the image bearing member that includes an at least one image bearing member having a surface on which a photosensitive layer is formed;
a charging device that is configured to charge the image bearing member with a predetermined surface potential;
a developing device
that is arranged to face the image bearing member,
that includes a developer carrying member which is configured to carry a developer, and
that is configured to form a toner image by applying predetermined developing voltage to the developer carrying member to cause a toner to adhere to an electrostatic latent image formed on the image bearing member;
a control unit that is configured to control
the optical scanning device, and
the developing device;
an IC driver that is configured to control the light source unit;
a circuit board
to which the IC driver is mounted and
which is housed in the casing; and
a temperature sensor that is mounted to the circuit board
wherein, on the circuit board, the temperature sensor is arranged on a side that is opposite to a side where the IC driver is present with an external connection terminal interposed between the temperature sensor and the IC driver, and
wherein the control unit controls the developing device on a basis of a temperature detected by the temperature sensor.

2. The image forming apparatus according to claim 1, wherein the control unit controls the optical scanning device on a basis of the temperature in the casing detected by the temperature sensor.

3. The image forming apparatus according to claim 1,
wherein the casing has an opening portion that is opened to face the developing device, and
wherein, in the casing, the temperature sensor is arranged to face the opening portion.

4. The image forming apparatus according to claim 1, wherein the optical scanning device
is arranged adjacently on an upper side relative to the developing device, and
further includes a duct
that is arranged between the optical scanning device and the developing device, and
that is configured to channel heat of the developing device to a side where the temperature sensor is present.

5. The image forming apparatus according to claim 4, wherein an internal flow path of the duct is narrowed toward the temperature sensor.

6. The image forming apparatus according to claim 5, wherein the control unit controls magnitude of the predetermined developing voltage on the basis of the temperature of the developing device, the temperature of the developing device being detected by the temperature sensor.

7. The image forming apparatus according to claim 6, wherein the control unit stops driving the developing device once the temperature of the developing device, the temperature of the developing device being detected by the temperature sensor, has exceeded a predetermined threshold.

8. An image forming apparatus, comprising:
an optical scanning device including
a light source unit that is configured to emit a laser beam,
a polygonal mirror that is configured to reflect the emitted laser beam from the light source unit by being rotated about a rotation axis extending in an upper-and-lower direction, whereby a peripheral surface of an image bearing member is scanned in a main scanning direction,
a scanning lens that is configured to form the laser beam reflected by the polygonal mirror into an image on the peripheral surface of the image bearing member,
a casing that is configured to house the light source unit,
the polygonal mirror, and
the scanning lens, and
  a temperature sensor that is configured to detect a
    temperature in the casing;
the image bearing member that includes an at least one
  image bearing member having a surface on which a
  photosensitive layer is formed;
a charging device that is configured to charge the image
  bearing member with a predetermined surface poten-
  tial;
a developing device
  that is arranged to face the image bearing member,
  that includes a developer carrying member which is
    configured to carry a developer, and
  that is configured to form a toner image by applying
    predetermined developing voltage to the developer
    carrying member to cause a toner to adhere to an
    electrostatic latent image formed on the image bear-
    ing member; and
a control unit that is configured to control
  the optical scanning device, and
  the developing device,
the temperature sensor detecting a temperature of the
  developing device,
the control unit
  controlling the optical scanning device on a basis of the
    temperature in the casing, the temperature in the
    casing being detected by the temperature sensor, and
  controlling the developing device on a basis of the
    temperature of the developing device, the tempera-
    ture of the developing device being detected by the
    temperature sensor,
the image forming apparatus further comprising:
an IC driver that is configured to control the light source
  unit; and
a circuit board
  to which the IC driver is mounted and which is housed in the casing,
wherein the temperature sensor is mounted to the circuit
  board, and
wherein, on the circuit board, the temperature sensor is
  arranged on a side that is opposite to a side where the
  IC driver is present with an external connection termi-
  nal interposed between the temperature sensor and the
  IC driver.

9. The image forming apparatus according to claim 8,
wherein the casing has an opening portion that is opened
  to face the developing device, and
wherein, in the casing, the temperature sensor is arranged
  to face the opening portion.

10. The image forming apparatus according to claim 8,
wherein the optical scanning device
  is arranged adjacently on an upper side relative to the
    developing device, and
  further includes a duct
    that is arranged between the optical scanning device
      and the developing device, and
    that is configured to channel heat of the developing
      device to a side where the temperature sensor is
      present.

11. The image forming apparatus according to claim 10,
wherein an internal flow path of the duct is narrowed toward
the temperature sensor.

12. The image forming apparatus according to claim 11,
wherein the control unit controls magnitude of the prede-
termined developing voltage on the basis of the temperature
of the developing device, the temperature of the developing
device being detected by the temperature sensor.

13. The image forming apparatus according to claim 12,
wherein the control unit stops driving the developing device
once the temperature of the developing device, the tempera-
ture of the developing device being detected by the tem-
perature sensor, has exceeded a predetermined threshold.

\* \* \* \* \*